T. B. & C. Green.
Felloe Sawing Mach.

No. 93,082.    Patented Jul. 27, 1869.

Witnesses.

Inventors.

United States Patent Office.

T. B. GREENE AND C. GREENE, OF ABINGTON, INDIANA.

Letters Patent No. 93,082, dated July 27, 1869.

---

IMPROVEMENT IN SCROLL-SAWING MACHINE.

---

The Schedule referred to in these Letters Patent and making part of the same.

---

To all whom it may concern:

Be it known that we, T. B. GREENE and C. GREENE, of Abington, in the county of Wayne, and in the State of Indiana, have invented certain new and useful Improvements in Scroll and Felloe-Sawing Machine; and do hereby declare that the following is a full, clear, and exact description thereof, reference being had to the accompanying drawings, and to the letters of reference marked thereon.

The nature of our invention consists in the construction of a self-feeding scroll and felloe-sawing machine, and in the arrangement of certain devices hereafter set forth and explained.

Figure 1:
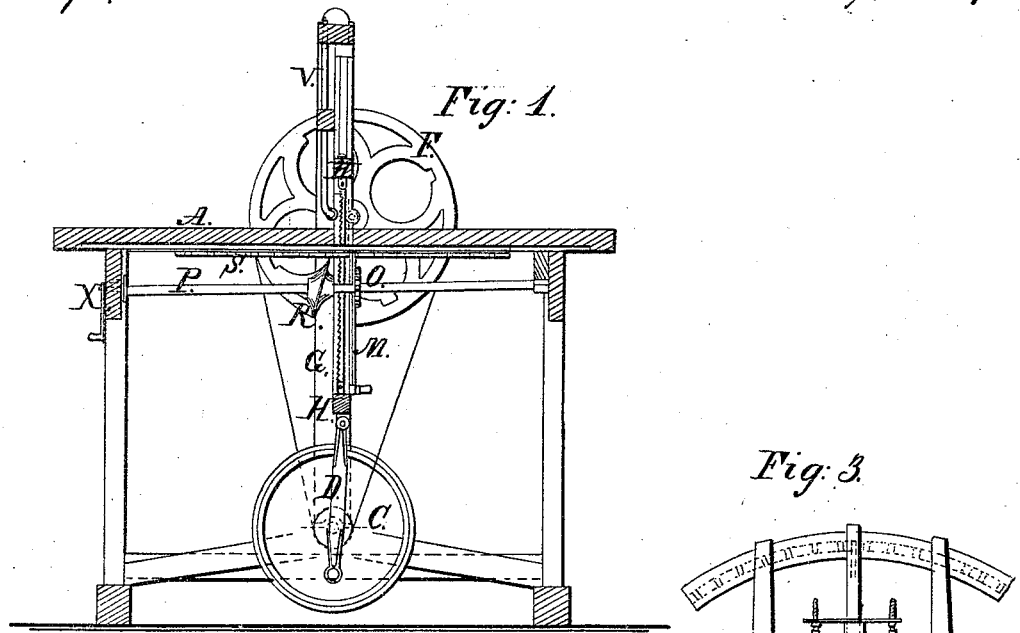
Figure 3:
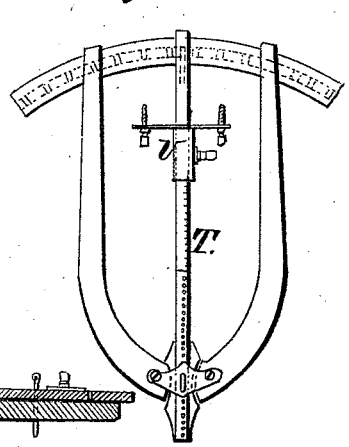
Figure 2:
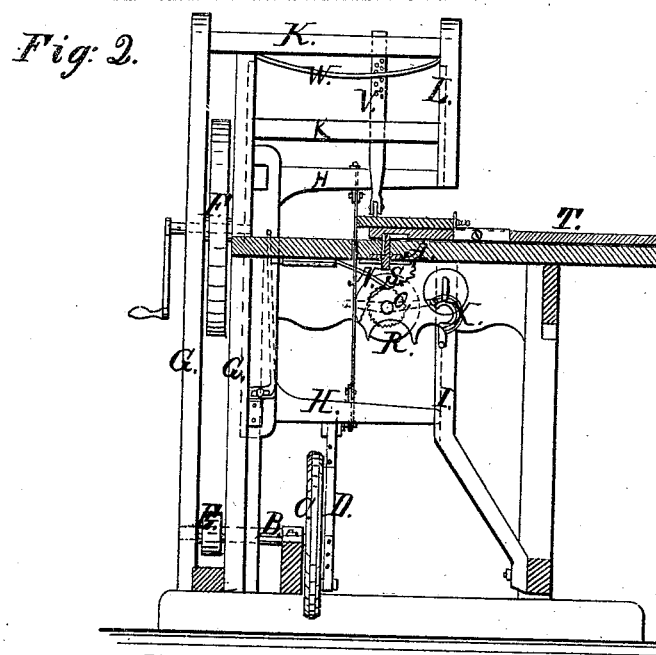

Figure 1 is a section of machine.
Figure 2 is an end view of the same.
Figure 3 is a plan view of the carriage.

Letter A represents the table of the machine, which may be made of any suitable size or shape.

Upon a cross-piece, extending across the bottom of the frame, there is an axle B, upon the end of which is placed the crank C, which operates the saw-frame by means of the pitman D.

Upon the opposite end of the shaft there is placed a small driving-wheel, E, over which the belt passes upon the large wheel F.

Secured to the back part of the frame there are two standards, G, which extend up above the frame, and serve as bearings for the axles of the wheels E and F, while the inside one has a groove cut in its side, in which the saw-frame H slides up and down.

Attached to a cross-piece upon the front side of the machine is another standard, I, which also has a groove cut in its inner side, so as to serve as a slide for the saw-frame.

Extending toward the front of the frame, from the top of the standards G, there are two cross-pieces, K, the outer ends of which are secured together by the upright piece L, which has a groove cut in its side, as shown by dotted lines, in which the saw-frame plays up and down.

To the side of the saw-frame H there is secured a long rod, M, which plays up and down, with the frame in a slot cut in the top of the table.

The lower end of said rod is attached to a slotted plate, so that it can be moved backward and forward, so as to regulate the feed.

Secured to the under side of the top part of the table, and playing in a slide, is the dog N, which operates the ratchet-wheel O.

The back end of this dog passes over the rod M, and as this rod moves up and down the dog is moved backward and forward, and at each forward movement it partly turns the ratchet-wheel O.

When the rod M extends almost perpendicular, this dog moves the wheel very slowly, and in proportion as this rod is placed obliquely, will the dog feed faster or slower.

As the slotted plate on the end of the rod M is furnished with a thumb-screw, the rod can be secured at any desired angle.

The ratchet-wheel O is mounted upon the adjustable shaft P, which can be raised or lowered at one end, as will be hereinafter set forth, and is provided with a wheel, R, which has a spiral edge or worm on its outer periphery.

The worm R gears with a curved rack-bar, S, placed in a groove on the under side of the top of the frame A, and supported by suitable guides.

This groove in the frame is of course curved similar to the rack-bar, and has a circular or curved slot along its entire length, through which passes a pin or projection on the upper side of the rack-bar S.

This pin engages with the carriage on which the wood to be sawed is placed, so that by the action of the dog N on the ratchet-wheel O, the carriage with the wood will be moved gradually in a circular course around the saw.

This carriage T consists of three arms, which are all joined together at the back end by suitable plates and thumb-screws.

The middle arm is perfectly straight, and has its outer end perforated, so that it can be moved either forward or back, so as to describe a larger or smaller circle, as may be desired.

Towards the other end this arm is graduated by a scale, so that the operator can see just how far forward the slide U has to be moved for the next cut.

This slide fits loosely over the straight arm, and is provided with a thumb-screw, so that it can be secured in its place.

Extending horizontally with the piece that is being sawed is a flat plate, which is provided with two thumb-screws, so as to secure it to the same.

The other two ends of the carriage branch out from the straight one, and serve as supports for the lumber that is being sawed, and assist to carry it along.

In the bottom of the straight arm there is cut a long slot, in which the small projection upon the upper side of the segmental bar S catches and carries it along.

Extending out from the front edge of the table there is a long arm, which has a number of holes cut through it, so as to correspond with the ones in the straight arm of the carriage.

The carriage is secured to this arm by means of a pin, and can be moved nearer to or farther from the saw, just as the circle to be cut is to be large or small.

In order to prevent the wood, while being sawed, from jolting and shaking, or being raised upward by the action of the saw, a long rod V, with a small roller upon its end, is suspended from the cross-pieces K, which holds the boards down.

The upper end of this rod has a number of holes made in it, so that it can be regulated to suit the varying thickness of the material to be sawed, and in order to give it elasticity, a spring, W, is placed above the pin, which regulates its drop.

After the carriage has been moved to the extent of its throw, the end of the shaft P is depressed by means of the lever X, so that the spiral wheel R is disengaged from the segmental bar S, when the carriage can be moved back to the starting-place.

This machine is especially intended for sawing scroll-work and felloes.

Having thus described our invention,

What we claim as new, and desire to secure by Letters Patent, is—

1. The arrangement of the saw-frame H, adjustable rod M, dog N, and worm R, on the adjustable shaft P, all substantially as herein set forth.

2. The arrangement of the segmental rack-bar S upon the under part of the table A, and provided with a pin which projects up through a slot in the table, for operating the carriage T upon the upper surface of the table, all substantially as specified.

3. The arrangement of the carriage T, composed of two adjustable pivoted arms and one central straight perforated arm, provided with a gauge or slide, V, and secured to the table by a pin, all constructed to operate substantially as specified.

In testimony that we claim the foregoing, we have hereunto set our hands, this 21st day of April, 1869.

T. B. GREENE.
C. GREENE.

Witnesses:
C. W. SMITH,
X. BALDINGER.